(12) United States Patent
Grojo et al.

(10) Patent No.: US 10,509,168 B2
(45) Date of Patent: Dec. 17, 2019

(54) METHODS AND SYSTEMS FOR OPTICAL FUNCTIONALISATION OF A SAMPLE MADE OF SEMICONDUCTOR MATERIAL

(71) Applicants: UNIVERSITÉ D'AIX MARSEILLE, Marseilles (FR); Centre National de la Recherche Scientifique, Paris (FR)

(72) Inventors: David Grojo, Marseilles (FR); Maxime Chambonneau, Marseilles (FR)

(73) Assignees: UNIVERSITÉ D'AIX MARSEILLE, Marseilles (FR); Centre National de la Recherche Scientifique, Paris (FR)

( * ) Notice: Subject to any disclaimer, the term of this patent is extended or adjusted under 35 U.S.C. 154(b) by 0 days.

(21) Appl. No.: 16/313,598

(22) PCT Filed: Jun. 27, 2017

(86) PCT No.: PCT/EP2017/065871
§ 371 (c)(1),
(2) Date: Dec. 27, 2018

(87) PCT Pub. No.: WO2018/002061
PCT Pub. Date: Jan. 4, 2018

(65) Prior Publication Data
US 2019/0265412 A1    Aug. 29, 2019

(30) Foreign Application Priority Data

Jun. 27, 2016   (FR) ..................................... 16 55979

(51) Int. Cl.
*G02B 6/12*        (2006.01)
*G02B 6/13*        (2006.01)
(Continued)

(52) U.S. Cl.
CPC ................ *G02B 6/13* (2013.01); *B23K 26/53* (2015.10); *G02B 6/122* (2013.01); *G02B 21/02* (2013.01);
(Continued)

(58) Field of Classification Search
CPC ...... H01L 2924/00; H01L 2924/00014; G02B 6/43; G02B 6/4214; G02B 6/12
See application file for complete search history.

(56) References Cited

U.S. PATENT DOCUMENTS

2001/0021293 A1   9/2001   Kouta et al.
2002/0076655 A1   6/2002   Borrelli et al.
(Continued)

FOREIGN PATENT DOCUMENTS

JP         2001-311847 A    11/2001

OTHER PUBLICATIONS

International Search Report issued in PCT/EP2017/065871 dated Oct. 4, 2017 (8 pages).
(Continued)

*Primary Examiner* — Jennifer Doan
(74) *Attorney, Agent, or Firm* — Osha Liang LLP

(57) ABSTRACT

According to one aspect, the invention concerns a system (100) for the in-depth optical functionalization of a sample (10) made of semiconductor material, comprising:
 a source (20) for emitting a laser beam formed by pulses of effective duration between 1 ps and 100 ns, having a wavelength in the spectral transparency band of the material;
 a microscope objective (40) for deep focusing in the sample of the laser beam in a predetermined pattern, the light intensity per pulse in a focal volume of the laser beam being adapted for multiphoton absorption in the semiconductor material;
(Continued)

a device (30) for measuring the real part of the refractive index of the sample at each point of the pattern;

a control unit (60) for controlling the number of pulses received per pattern point as a function of said measurement of the real part of the refractive index so as to obtain, at each pattern point, a progressive modification of the real part of the refractive index of the material until a relative variation of the real part of the refractive index greater than $10^{-3}$ in absolute value is obtained.

15 Claims, 13 Drawing Sheets

(51) Int. Cl.
*B23K 26/53* (2014.01)
*G02B 6/122* (2006.01)
*G02B 21/02* (2006.01)

(52) U.S. Cl.
CPC ............. *G02B 2006/12102* (2013.01); *G02B 2006/12107* (2013.01)

(56) References Cited

U.S. PATENT DOCUMENTS

2005/0180302 A1* 8/2005 Tamada ................. B82Y 10/00
369/275.1
2012/0268939 A1 10/2012 Finarov et al.
2016/0008927 A1* 1/2016 Grundmueller ........ B23K 26/57
65/112

OTHER PUBLICATIONS

Written Opinion of the International Searching Authority issued in PCT/EP2017/065871 dated Oct. 4, 2017 (12 pages).

\* cited by examiner

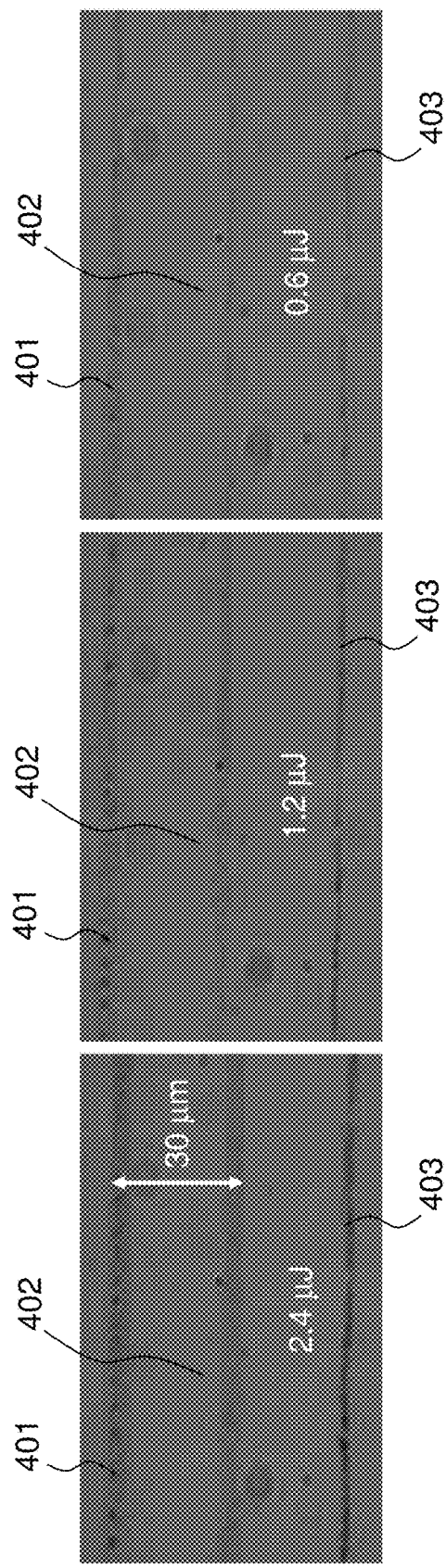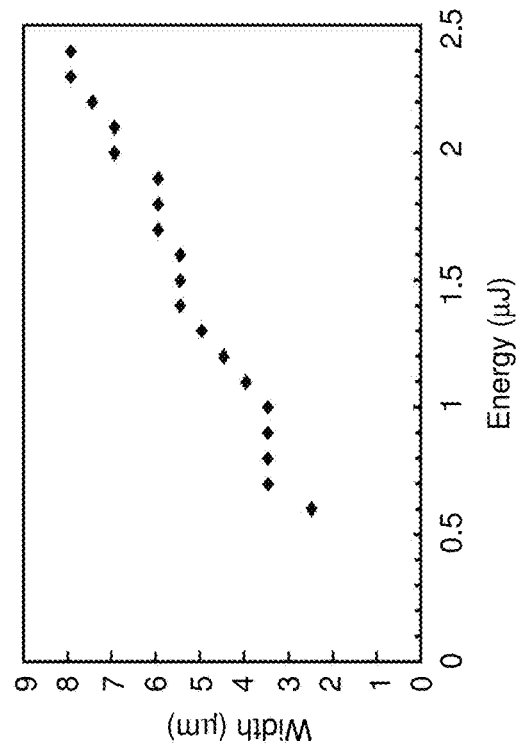

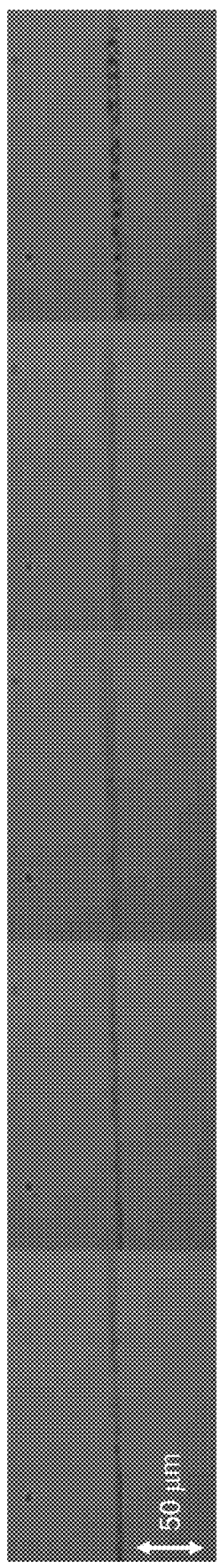
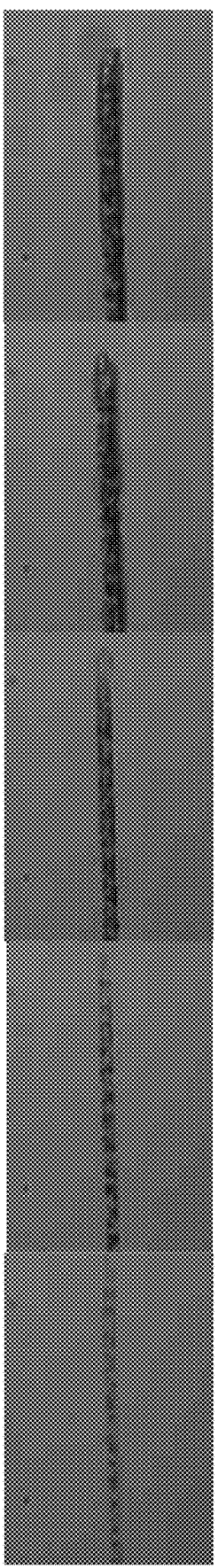
FIG.5A  $v = 1 \times 10^0$ mm/s
FIG.5B  $v = 5 \times 10^{-1}$ mm/s
FIG.5C  $v = 1 \times 10^{-1}$ mm/s
FIG.5D  $v = 5 \times 10^{-2}$ mm/s
FIG.5E  $v = 1 \times 10^{-2}$ mm/s
FIG.5F  $v = 5 \times 10^{-3}$ mm/s
FIG.5G  $v = 1 \times 10^{-3}$ mm/s
FIG.5H  $v = 5 \times 10^{-4}$ mm/s
FIG.5I  $v = 1 \times 10^{-4}$ mm/s
FIG.5J  $v = 5 \times 10^{-5}$ mm/s

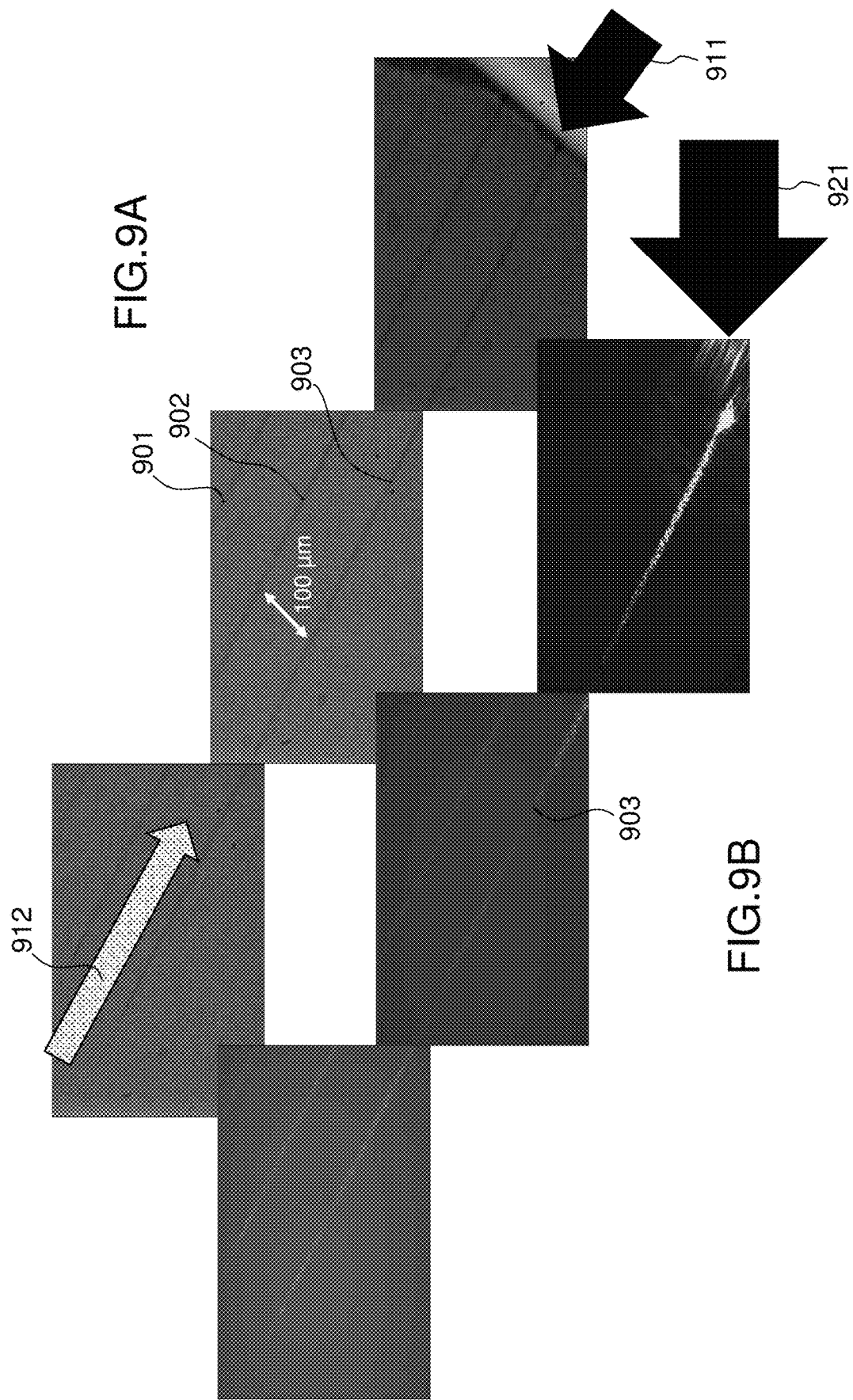

METHODS AND SYSTEMS FOR OPTICAL FUNCTIONALISATION OF A SAMPLE MADE OF SEMICONDUCTOR MATERIAL

STATE OF THE ART

Technical Field of the Invention

This invention concerns processes and systems for deep optical functionalization of a sample of semiconductor material, including the three-dimensional inscription of optical waveguides deeply in the sample.

State of the Art

The emergence of femtosecond laser sources has made it possible to develop well-controlled direct 3D laser writing technologies in transparent dielectric materials such as glass, particularly for applications involving the "optical functionalization" of the material, particularly by writing optical waveguides. Optical functionalization is achieved by controlled variation of the real part of the refractive index in dielectric materials (see for example K. M. Davis et al. " *Writing waveguides in glass with a femtosecond laser*", Opt. Letters, Vol. 21, Nr 21 (1996)).

However, to date, no optical functionalization technology similar to those known for dielectric materials has been demonstrated in the volume of monolithic semiconductor materials, particularly in silicon.

This is mainly due to the emergence and generalization only very recently of ultrashort sources in the infrared, whether Optical Parametric Amplifiers (or OPA) or fibre lasers. This is also due to the importance of non-linear effects during the propagation and absorption of light in semiconductor materials, which intrinsically limit femtosecond laser energy deposition to a level insufficient for material modification (see for example A. Mouskeftaras et al. "*Self-limited underdense microplasmas in bulk silicon induced by ultrashort laser pulses*", Appl. Phys. Lett. 105, 191103 (2014)). This self-protection effect of silicon has very recently been explained by an induced defocusing of infrared beams by the plasma formed during interaction (E. V. Zavedeev et al. "*Delocalization of femtosecond laser radiation in crystalline Si in the mid-IR range*", Laser Phys. 26, 016101 (2015))

Some techniques for optical functionalization in semiconductors have been developed, such as the so-called "Silicon-on-Insulator" or "SOI" technology, in which a surface-structured crystalline silicon layer is sandwiched between a layer of embedded insulating material and a low index upper layer (or air). This results in a propagation of electromagnetic waves in the waveguides through an internal total reflection mechanism (see for example M. Lipson et al. "Guiding, modulating and emitting light on silicon—challenges and opportunities", Journal of Lightwave Technology, Vol. 23, Nr 12 (2005)). Although SOI technology provides excellent optical performance, it nevertheless has major disadvantages, specific to lithography. A first disadvantage is that the manufactured waveguides are contained in a plane (i.e., 2D), which prevents the design of three-dimensional architectures for the optical functionalization of the material. A second disadvantage is that this technique requires several steps in a clean and controlled environment in order to avoid problems related to unwanted external pollution. The availability of a direct laser writing technology would make possible to overcome these limitations.

Some works have been published on the direct inscription of optical waveguides in semiconductor materials (see, for example, published patent application US 2012/0268939). However, no technique seems to have demonstrated tangible results allowing direct inscription of optical waveguides deep in a semiconductor material, which would open the door to optical functionalization by direct 3D laser writing in semiconductor materials, and in particular in silicon.

One of the objectives of the invention is to propose optical functionalization processes and systems by direct laser inscription in depth in a sample of semiconductor material that is reliable and reproducible.

SUMMARY OF THE INVENTION

According to a first aspect, this description concerns a process for the in-depth optical functionalization of a sample of semiconductor material, comprising:
  the emission of a laser beam formed by pulses of effective duration between 1 ps and 100 ns, having a wavelength in the spectral transparency band of the material;
  focusing deep in the sample of the laser beam, according to a predetermined pattern, the light intensity per pulse in a focal volume of the laser beam being adapted to the generation of multi-photonic absorption;
  measuring the real part of the refractive index of the sample at each point of the pattern;
  controlling the number of pulses received per pattern point, or "number of shots", according to said measurement of the real part of the refractive index so as to obtain, at each pattern point, a progressive modification of the real part of the refractive index of the material until a relative variation of the real part of the refractive index greater than $10^{-3}$ in absolute value.

Optical functionalization in this description refers to the inscription within the material of optical functions resulting from a local variation in the real part of the refractive index, with little or no modification of the imaginary part (relative variation less than $10^{-3}$). The written optical functions are generally suitable for modifying the spatial, temporal or spectral properties of light within the material, and include, but are not limited to, guiding a light wave, modifying the polarization of a light wave, modifying the front of a light wave (in particular by writing one or more micro lenses), spectral filtering (in particular by writing diffraction gratings, for example Bragg gratings).

Thus, according to one or more examples of embodiments, the pattern is determined for the formation of at least one of the following optical elements: waveguide, micro lens, diffraction grating, beam splitter, optical filter, waveplate and more generally any optical micro-device based on a controlled index distribution in the volume of the material.

The applicants have shown that the process thus described makes it possible, by controlling the variation of the real part (n) of the refractive index, not to exceed relative variations ($\Delta n/n$) of the real part of the refractive index beyond which it is considered that there is damage to the material, in particular by the formation of microcavities, and no longer inscription of an optical function. Typically, the relative $\Delta n/n$ variation of the real part of the refractive index will be limited to a value less than 0.1 in absolute value.

According to one or more examples of embodiment, the control of the number of shots allows to obtain a positive relative variation of the real part of the refractive index. A relative positive variation of the real part of the refractive index results from a structural modification of the material (densification, amorphization, . . . ) and allows the formation of waveguides, diffraction gratings, micro lenses and any other optical element defined by a positive variation of the refractive index.

According to one or more examples of embodiment, the control of the number of shots makes it possible to obtain a negative relative variation of the real part of the refractive index, without this variation exceeding 0.1 in absolute value, advantageously 0.01. A negative relative variation of the real part of the refractive index may result from a change in the crystalline state, or from the formation of nano-cavities or "nanocracks", of dimensions smaller than one-tenth of the wavelength to avoid introducing optical defects, and in particular allows the formation of lenses, waveplates, waveguides defined by a ring of refractive index smaller than a central part, and any other optical element defined by a negative variation in the refractive index.

The applicants have also shown that the process described above makes it possible, by controlling the variation of the real part of the refractive index along the pattern, to obtain optical functionalization with excellent optical performance, by limiting optical defects that would result from spatial inhomogeneities of the real or imaginary part of the refractive index. Spatial inhomogeneities of the real or imaginary part of the refractive index can be defined as inhomogeneities that may introduce light scattering phenomena. Typically, they result from local variations in the refractive index (real or imaginary part) greater than $10^{-3}$ in absolute value, in volumes at least one dimension of which is greater than one-tenth of the wavelength (wavelength at which the functionalized material is to be used).

The spectral transparency band of the semiconductor material is defined according to the band gap energy. More precisely, we consider in this description that a wavelength $\lambda$ belongs to the spectral transparency band if the wavelength verifies $\lambda > 0.8$ hc/$\Delta$ where h is the Planck constant, c is the speed of light in vacuum and $\Delta$ is the energy band gap of the material (or more simply "gap"); the factor 0.8 allows to ensure in all cases an optical penetration necessary to work under the surface.

The described process applies to all direct or indirect, amorphous or crystalline prohibited band (or "gap") semiconductors, by adjusting the wavelength of the pulses to satisfy the previously given relationship.

According to one or more examples of embodiment, each pulse is formed by a single pulse with a duration between 1 ps and 100 ns. According to other examples of embodiment, each pulse consists of an ultrashort pulse train (i.e. strictly less than 1 ps), the duration of the pulse train corresponding to the sum of the durations of all ultrashort pulses in the train and being between 1 ps and 100 ns. In the rest of the description, we will simply speak of "pulse", whether the pulse is formed by a single pulse or a train of ultrashort pulses.

The intensity I of a pulse is defined by $$I = \frac{2E}{\tau \pi w_0^2}$$

where E is the energy of the pulse, $\tau$ the time width at half-maximum and w0 the radius of the focal spot, measured at $1/e^2$ of the spatial energy beam profile, in the case of a Gaussian beam.

When the pulse is formed by a train of ultrashort pulses, the time width considered is equal to the sum of the time widths at half-maximum of the ultrashort pulses forming the pulse train and the energy considered is equal to the sum of the energies of the ultrashort pulses forming the pulse train.

In the following description, we can speak indifferently of energy or luminous intensity of the pulse from the moment when the pulse duration and the geometry of the beam are fixed.

According to one or more examples of embodiment, the pulses are emitted with a given repetition rate of less than 100 kHz, advantageously less than 10 kHz. With a sufficiently low pulse repetition rate, heat accumulation at one point in the pattern is limited and the risk of material damage resulting in micro-cavities is limited.

According to one or more examples of embodiment, the process also includes the spatial shaping of the pulses.

According to one or more examples of embodiment, the process also includes the relative movement of the laser beam and the sample along said pattern at a given scanning speed.

According to one or more examples of embodiment, the pulses are emitted with an even lower repetition rate, for example between 100 Hz and 5 kHz, compatible with relative beam and sample displacement rates obtained by common displacement means.

According to one or more examples of embodiment, the control of the number of received pulses per pattern point includes the control of a pulse repetition rate and/or the control of a scanning rate of the laser beam in the sample and/or the control of a dimension of the focal volume. In practice, this dimension may be the focusing length or "Rayleigh distance", in the case of an inscription made by relative displacement of the optical beam along an axis parallel to the optical axis of the laser beam ("longitudinal writing"). The focusing length is generally defined as the length of the area in which the beam radius is less than $\sqrt{2}w_0$. This dimension may be equal to 2 times the radius of the focal spot ($2w_0$) in the case of an inscription made by relative displacement of the optical beam along an axis perpendicular to the optical axis of the laser beam ("transverse writing").

According to one or more examples of embodiment, the process also includes the control of the light intensity per pulse in the focal volume to obtain the progressive modification of the real part of the refractive index of the material. Compared to a direct control of the number of shots at a point in the pattern, scanning at a given speed of pulses emitted at a given repetition rate provides a better homogeneity of the variation of the real part of the refractive index of the material.

According to one or more examples of embodiment, the control of the number of pulses includes:
  a first step of controlling the number of pulses received per point of the pattern to achieve a first relative variation of the real part of the refractive index;
  at least a second step of controlling the number of pulses received per pattern point to achieve a second relative variation of the real part of the refractive index;
  an iteration of said second step until a relative variation of the real part of the refractive index greater than or equal to a predetermined value is obtained, said predetermined value being greater than $10^{-3}$ in absolute value.

The applicants have shown that an iteration process allows a very fine control of the variation of the real part of the refractive index, guaranteeing a very good homogeneity of the index variations and thus excellent performances in the optical functions performed.

According to one or more examples of embodiment, the first and second relative variation of the real part of the refractive index corresponds to the smallest detectable variation of the real part of the refractive index. By choosing the detectability threshold of the variation of the real part of the index as the values of the first and second relative variations of the real part of the refractive index, having to make a preliminary study of the material is avoided.

According to one or more examples of embodiment, the process also includes a gradual increase in the light intensity per pulse in the focal volume, from a predetermined minimum value, during each step.

According to one or more examples of embodiment, the process also includes an increase in the light intensity per pulse in the focal volume, from a predetermined minimum value, when moving from one step to a subsequent step.

In both of the foregoing examples, the progressive modification of the luminous intensity per pulse makes it possible to achieve a greater fineness in the variation of the real part of the refractive index and thus to limit any risk of damage.

According to one or more examples of embodiment, the process also includes a preliminary calibration phase.

This preliminary calibration phase makes it possible to determine, for a given semiconductor material, parameter ranges within which the process can be implemented according to operational conditions. For example, for pulses of a given effective duration, transmitted at a given repetition rate, and for a given beam geometry, ranges of values for scanning rates and/or energies per pulse can be determined.

According to one or more examples of embodiment, the preliminary phase of calibration also includes the determination of the polarization of the laser beam and illumination according to the optical function(s) sought.

Thus, for the optical functionalization of silicon in particular, the applicants have identified optimal parameter ranges for the writing of optical functions, such as waveguides, which can indifferently be combined with each other:
  pulse duration between 1 and 10 ns;
  pulse wavelength greater than 1.1 µm, for example around 1.55 µm;
  beam diameter less than 10 µm;
  repetition rate between 100 Hz and 5 kHz, for example around 1 kHz;
  scanning speed of the relative displacement of the laser beam between 0.01 and 0.5 mm/s, for example around 0.1 mm/s;
  the luminous intensity of a laser pulse in the focal volume greater than 4 $GW/cm^2$, which corresponds to an energy per pulse greater than 0.5 µJ for a beam diameter of 2.3 µm and a pulse duration of 5 ns.

According to one or more examples of embodiment, the process also includes a measurement of the imaginary part of the refractive index, making it possible to verify that the value of the relative variation of the imaginary part of the refractive index remains below $10^{-3}$ in absolute value.

According to a second aspect, this description concerns devices for the implementation of processes according to the first aspect.

According to one or more examples of embodiment, this description concerns a system for the in-depth optical functionalization of a sample of semiconductor material, comprising:
  a source for emitting a laser beam formed by pulses with effective durations of between 1 ps and 100 ns, having a wavelength in the spectral transparency band of the material;
  a microscope objective for deep focusing in the sample of the laser beam according to a predetermined pattern, the light intensity per pulse in a focal volume of the laser beam being adapted for multiphoton absorption in the semiconductor material;
  a device for measuring the real part of the refractive index of the sample at each point of the pattern;
  a unit for controlling the number of pulses received per pattern point, or "number of shots", according to said measurement of the real part of the refractive index so as to obtain, at each pattern point, a progressive modification of the real part of the refractive index of the material until a relative variation of the real part of the refractive index greater than $10^{-3}$ in absolute value.

According to one or more examples of embodiment, the system also includes relative means of displacement of the focal volume and the sample for focusing the laser beam according to the predetermined pattern.

According to one or more examples of embodiment, the measuring device is a phase microscope.

According to one or more examples of embodiment, the measuring device includes a dark-field microscope.

According to one or more examples of embodiment, the measuring device also allows a measurement of the imaginary part of the refractive index.

BRIEF DESCRIPTION OF THE DRAWINGS

Other advantages and characteristics of the invention will appear upon reading the description, illustrated by the figures below:

FIGS. 4A to 4C, show experimental results showing the influence of pulse energy for different scanning rates of the laser beam and FIG. 4D shows an experimental curve illustrating the width of a waveguide obtained as a function of the energy per pulse;

FIGS. 5A to 5J, show experimental results showing the influence of the scanning speed of the laser beam;

FIGS. 9A and 9B, show experimental results showing the propagation of light in an elementary waveguide obtained by a process according to this description, into silicon, the light being injected at a non-zero angle with respect to the direction of the waveguide;

DETAILED DESCRIPTION

FIG. 1 illustrates a first example of a laser marking system 100 for deep optical functionalization in a sample 10 of semiconductor material, as described here.

Figure 1A:
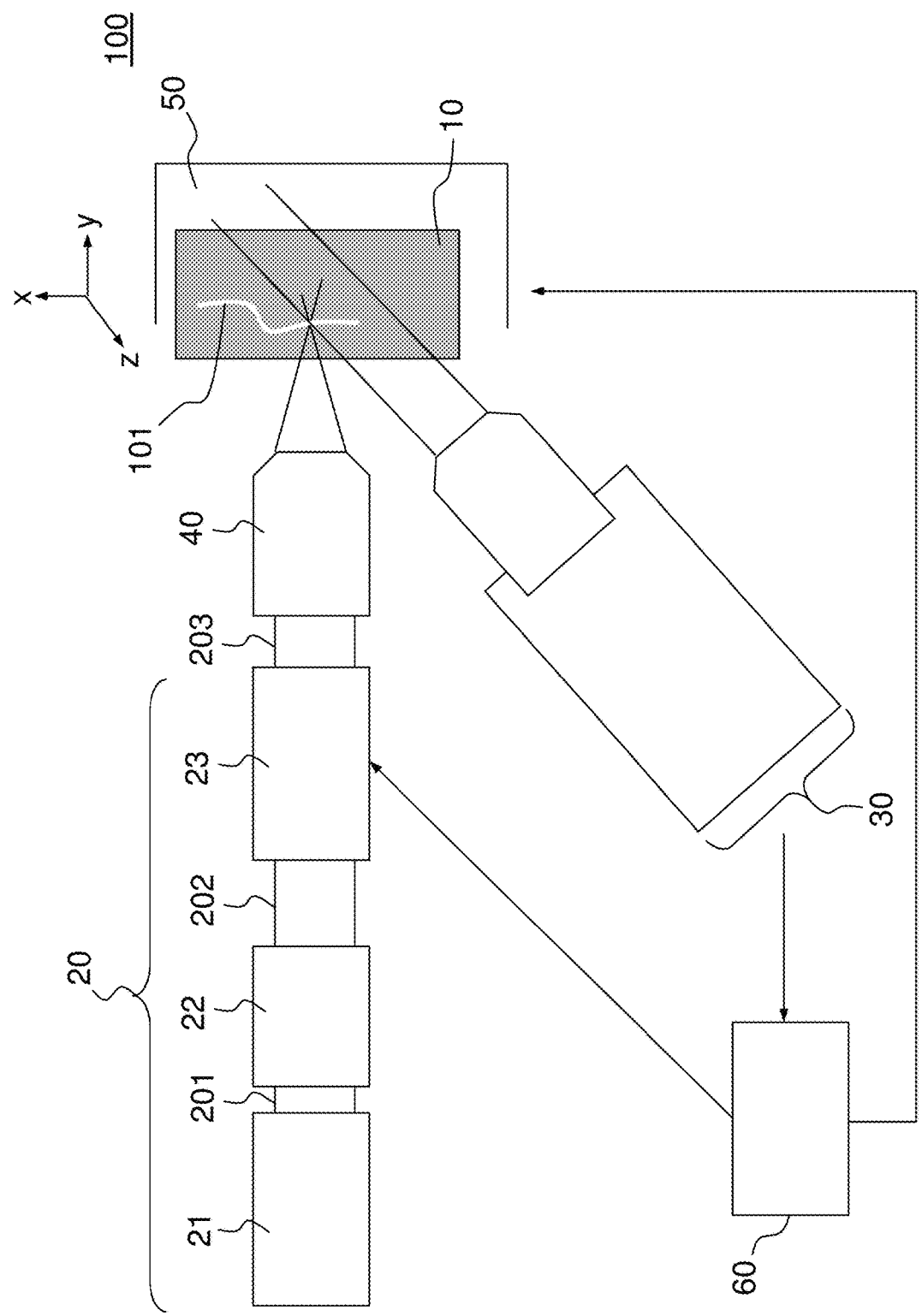
FIG. 1A is a diagram illustrating an example of a laser inscription system for deep optical functionalization in a semiconductor material, as described in this description.

The laser marking system 100 includes, in particular, an emission source 20 of a laser beam 203 formed of pulses and a focusing system 40 for focusing of the laser beam in the sample (e. g. a microscope objective, a converging lens, a parabolic mirror, etc.). The resulting focal volume can be moved deep into the sample in a pattern 101 by means of relative means of movement 50 of the laser beam and the sample. In the example of FIG. 1A, the relative means of displacement 50 include a plate for moving the sample along the 3 axes X, Y, Z. However, each of the translations can be replaced by an optical device adapted to the movement of the beam, for example a lens called a "f-theta lens". System 100 also includes a device 30 for measuring the real part of the refractive index in the sample and a control unit 60 of the number of pulses received per point of the pattern, or "number of shots", depending on the measurement of the real part of the refractive index.

More specifically, in the example of FIG. 1A, the emission source 20 comprises a pulsed laser source 21 adapted to emit first pulses 201 at wavelength within the spectral transparency band of the material, a module 22 (optional) for temporal and/or spatial shaping of the pulses delivered by the pulsed laser source 21 and an energy control module 23.

Pulse shaping module 22 includes, for example, pulse time shaping means. Module 22 includes, for example, a mechanical device (e. g. a shutter), an electro-optical device (e. g. a Pockels cell and a polarizer), or an acousto-optical device to "cut" a succession of ultrashort pulses into pulse trains. Conversely, the shaping module may include an optical device to transform a single femtosecond pulse into an ultrashort pulse train with an effective duration greater than 1 ps.

Pulse shaping module 22 may also include means for spatial pulse shaping. Module 22 includes, for example, an adaptive optics device or a passive device (e. g. slit, cylindrical lenses or phase mask) to shape the focal spot, suitable for example for "transverse writing" procedures.

Thus, the pulsed laser source 21 can include any type of long pulse laser (>ps) (e.g. OPO, fibre laser, etc.), or any type of short pulse laser (<1 ps) with a rate >1 MHz by then "cutting" the emitted pulses, thanks to the shaping module 23, to form pulse trains of a duration greater than 1 ps, or any type of short pulse laser (<1 ps) with a rate <1 MHz by optically "separating" the short pulses into short pulse trains with a rate >1 MHz (each pulse train then playing the role of a long pulse of a duration >1 ps).

At the output of emission source 20, the laser beam 203 is thus formed by pulses with effective durations of between 1 ps and 100 ns, whether they are single pulses or ultrashort pulse trains, the duration of a pulse train being between 1 ps and 100 ns.

The energy control module 23 includes, for example, a combination of a half-wave plate and a polarizer or a set of attenuating filters.

The pattern 101 traversed by the focal volume of the beam 203 is determined according to the optical function which is to be implemented in the sample.

According to one or more examples of embodiment, the focal volume of the laser beam travels along one or more simple lines and/or branches, allowing to form "channels" with a positive index change; the optical elements thus realized are simple waveguides or coupler-type devices, allowing 3D optical circuitry to be written in the sample. The positive index change results from a structural modification of the material (densification, amorphization, . . . ); for example, amorphous silicon has a lower density than its crystalline phase. It is therefore possible to change its crystallinity to densify it.

According to one or more examples of embodiment, an irradiation can be repeated at a point, the change of index then spontaneously takes a biconvex shape (the shape of the focal spot) and thus forms a microlens type element. In this case, a relative displacement of the laser beam and the sample is only performed in cases where the objective is to form microlenses larger than the focal volume.

According to one or more examples of embodiment, a controlled irradiation of the material can be carried out to form "nanocracks" in the material, of dimensions less than one-tenth of the wavelength. The inclusion of the "vacuum" then allows a negative index change of up to about $10^{-2}$ without loss; moreover, the "nanocracks" are perpendicular to the polarization, which induces form birefringence allowing waveplates to be made.

According to one or more examples of embodiment, a diffraction grating can be inscribed by inscribing waveguides arranged parallel to each another, separated by a predefined regular step.

In general, an arbitrary shape can be given to the pattern traversed by the laser beam, so that any optical micro-device based on a controlled index distribution in the volume of the material can be achieved.

As described in more detail below, the measuring device 30 of the real part n of the refractive index of the sample is connected to the control unit 60. The control unit 60 allows to control the number of pulses received per pattern point according to the measurement of the real part of the refractive index so as to obtain, at each pattern point, a progressive modification of the real part of the refractive index of the material up to a relative $\Delta n/n$ index variation in the value of the index greater than $10^{-3}$.

Consequently, in the example of FIG. 1A, the control unit is connected to one and/or other of the modules 21-23 forming the emission source 20 for the control of laser parameters (repetition rate, pulse duration, wavelength, beam geometry, pulse energy, polarization, spatial shape of the beam) and/or the relative displacement means 50 of the laser beam and the sample (e. g. scanning rate, number of passes on a given point of the pattern).

In particular, the control of the type of polarization (circular, linear, other) can be adapted according to the optical function required.

In the same way, the type of beam geometry (Gaussian, Bessel, vortex, top-hat, etc.) can also be adapted according to the optical function required.

Figure 1B:
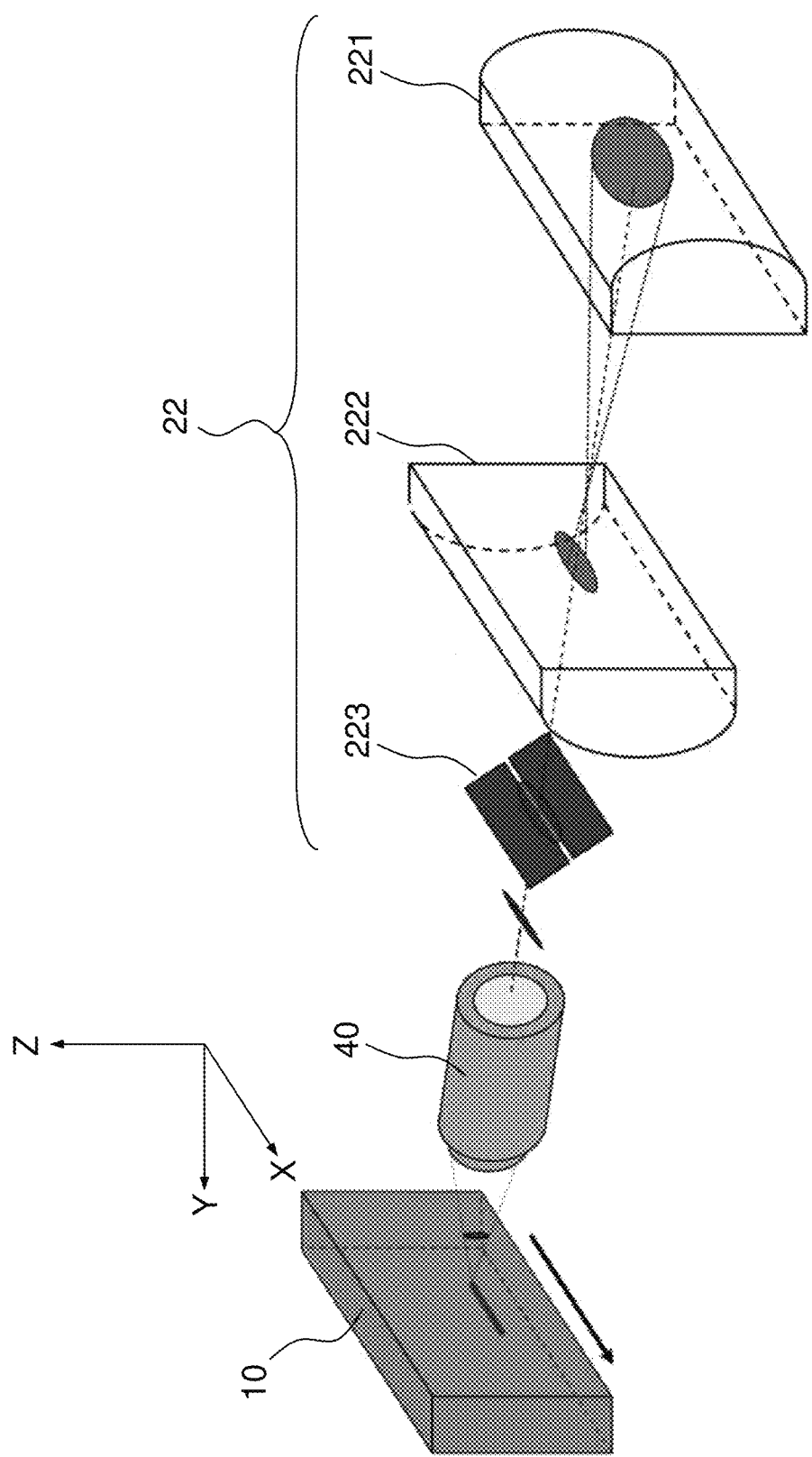
FIG. 1B is an example of a module adapted to the spatial shaping of pulses and FIG. 1C represents images illustrating the spatial profile of the pulses respectively without shaping (a), with shaping in air (b, c) and with shaping in a sample (d, e)

FIG. 1B illustrates an example of module 22 adapted for the spatial implementation of the beam for transverse writing in the volume of a sample 10, for example silicon. Module 22 includes a first cylindrical lens 221, at the entrance of which an incident laser beam is Gaussian, with a diameter of Ø. This first cylindrical lens 221 has the property of focusing the beam in one direction (noted Z), and not modifying it in the perpendicular direction (noted X). Module 22 includes a second cylindrical lens 222, with a shorter focal length than the first, with an object focus corresponding to the image focus of the first cylindrical lens 221. Consequently, the set of the two lenses (here converging) form an afocal assembly called a "cylindrical telescope". The beam after the second cylindrical lens is collimated, elliptically shaped, and the ratio between its small axis and its large axis is $R=f_2/f_1$, where $f_1$ and $f_2$ correspond to the focal lengths of the first and second lens, respectively.

In order to reduce this ratio R, module 22 includes an adjustable aperture slot 223 s smaller than the small beam axis, placed on the optical axis (noted Y), parallel to the direction of the large beam axis. At the exit of the slot, the beam then has a large axis of length Ø, and a small axis of width s. By adjusting the value of s in relation to the numerical aperture of the focusing system 40 (here a microscope objective), the size of the entry pupil of this system, and the depth of the writing in the material, the beam in a plane containing the optical axis Y has an elliptical, even circular geometry.

Figure 1C:
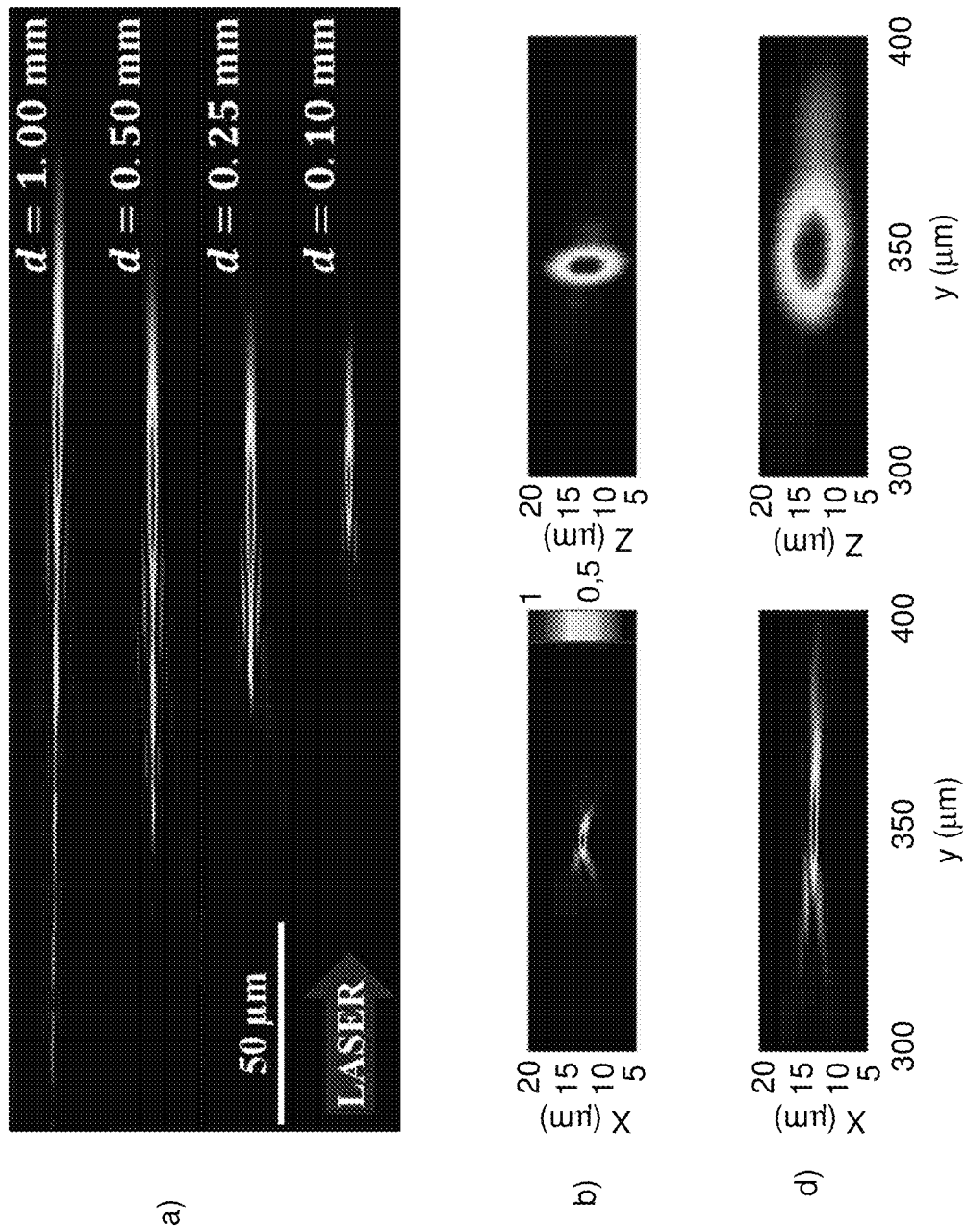

FIG. 1C thus shows experimental images illustrating the spatial profile of the pulses respectively without shaping (a), with shaping in air (b, c) and with shaping in a sample (d, e).

More precisely, image a) shows the evolution of the propagation of a Gaussian beam (i.e., without spatial shaping) as a function of the writing depth d in a plane containing the optical axis (here horizontal). The prefocal pattern on each experimental image is due to the effect of spherical aberrations. In accordance with the theory, it is all the more pronounced the deeper the beam is focused into the material. In addition, the Rayleigh distance is all the more lengthened the greater the importance of d. Thus, to obtain the same beam shape in a plane containing the optical axis Y, it will be necessary to close the slit all the more narrowly than d is large.

Figure 2:
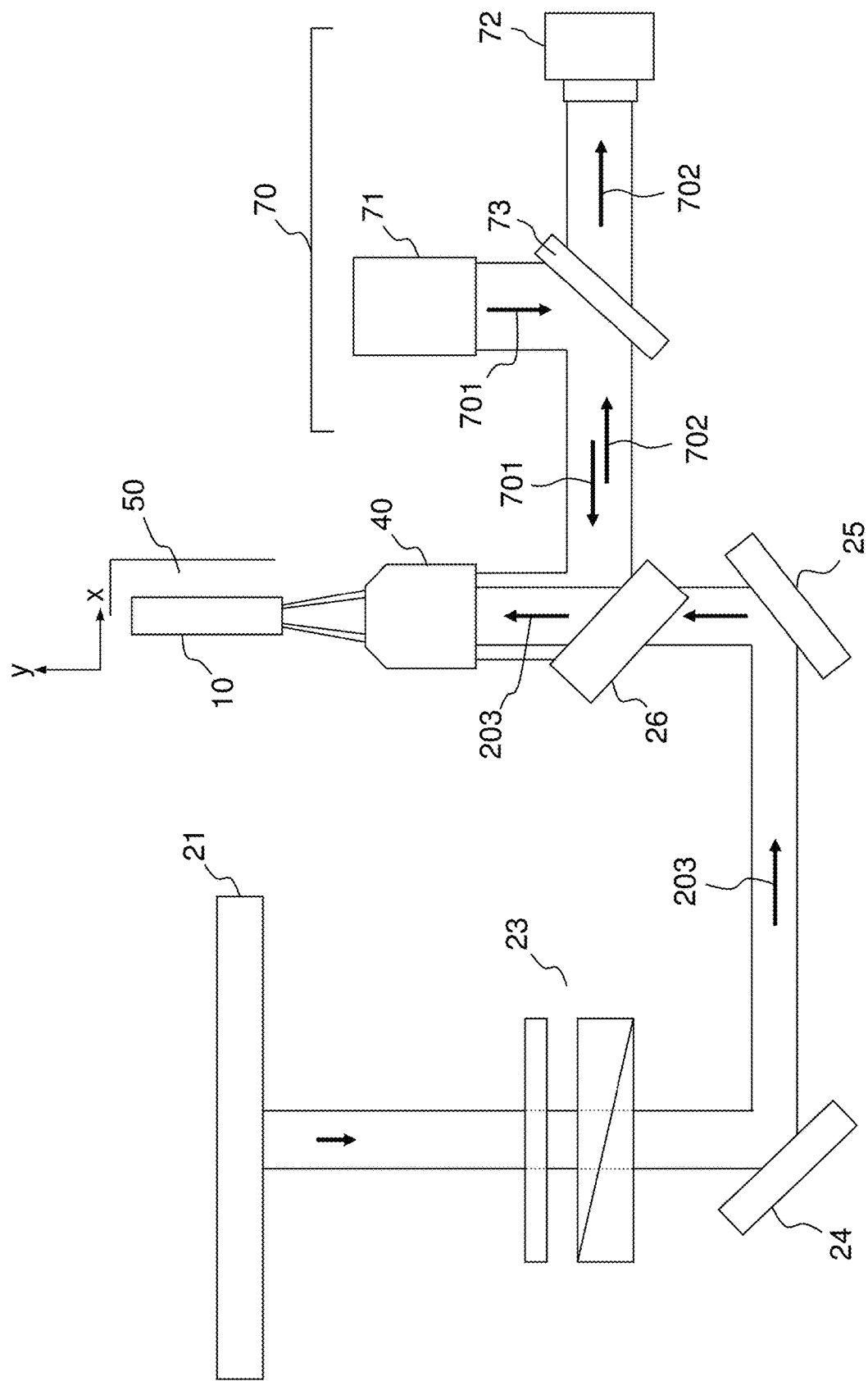
FIG. 2, is a diagram illustrating, according to one example, a first subsystem of a laser inscription system according to this description, for the modification of the real part of the refractive index in the semiconductor material.

Images b) and c) show the evolution of the beam propagation in air and images d) and e) show the evolution of the beam propagation at d=100 μm depth in the sample (silicon), with an aperture slit s=280 μm oriented along Z, in perpendicular planes (X, Y) (left) and (Z, Y) (right) each containing the optical axis Y. In each medium, the propagation in the plane (X, Y) is in accordance with that predicted by Gaussian focusing theory. On the other hand, in the plane (Z, Y), the propagation is elliptical. This is due to the loss of the numerical aperture of the focusing system in the direction perpendicular to the slit. Lastly, whatever the observation plane, a propagation in silicon similar to air is noticed, but stretched by a factor of 3.5 which corresponds to the real part of the refractive index of crystalline silicon. FIG. 2 illustrates in an example of an embodiment of a first subsystem of a laser inscription system according to this description, which allows the modification of the real part of the refractive index in the semiconductor material. Thus, the device for measuring the real part of the refractive index is not represented on FIG. 2.

The first subsystem includes an emission source 20 of a laser beam 203 formed of pulses; in this example, the emission source 20 includes a pulsed laser source 21 producing pulses at a given wavelength, for example at a wavelength of 1550 nm for the optical functionalization of silicon. The pulses are for example simple pulses, with a pulse duration between 1 ps and 100 ns, advantageously greater than 1 ns, emitted with a repetition rate between 100 Hz and 5 kHz. In the example of FIG. 2, the emission source 20 includes a pulse energy control module 23, consisting for example in a half-wave plate and a polarizer, the energy being controlled, for example, by rotating the half-wave plate. The beam is then transported by mirrors 24, 25, the mirrors allowing a reflection greater than 95% at the emission wavelength of the pulse source 21, for example gold mirrors. The laser beam is focused in sample 10 by a focusing system 40, for example a microscope lens of which the numerical aperture defines the size of the focal volume. In the example of FIG. 2, motorized stages allow the sample to be positioned and moved in the plane (X, Z) perpendicular to the optical axis Y.

Thus, in the example of FIG. 2, the process can be implemented by working with fixed beam geometry, pulse duration and fixed repetition rates. The parameters that can be controlled to obtain the progressive variation of the refractive index will be the energy per pulse, and the scanning speed and the number of passes to control of the number of shots. Of course, alternatives are possible. In particular, it may be considered to vary the beam geometry by using several objectives, or in other examples it may be possible to vary the pulse duration and/or the repetition rate.

In addition, in the example of FIG. 2, a reflective infrared microscope 70 is implemented on the device in order to position the sample and visualize the irradiated area. It includes an emission source 71, for example a light-emitting diode (LED), producing continuous light 701 at a wavelength within the spectral transparency band of the material but different from the emission wavelength of the pulse source 21, for example a source at 1200 nm. The incident light 701 first passes through a semi-reflective plate 73, for example a 50/50 beam splitter. This light is then sent into the microscope objective 40 by a dichroic mirror 26, transparent at the emission wavelength of source 21 and reflecting at the emission wavelength of source 71. The light is thus focused, then reflected on the sample 10. After reflection, the light follows the reverse path 702, and passes again through the semi-reflective plate 73. The transmitted light is finally collected by a camera 72 which allows to visualize the focusing area.

Figure 3:
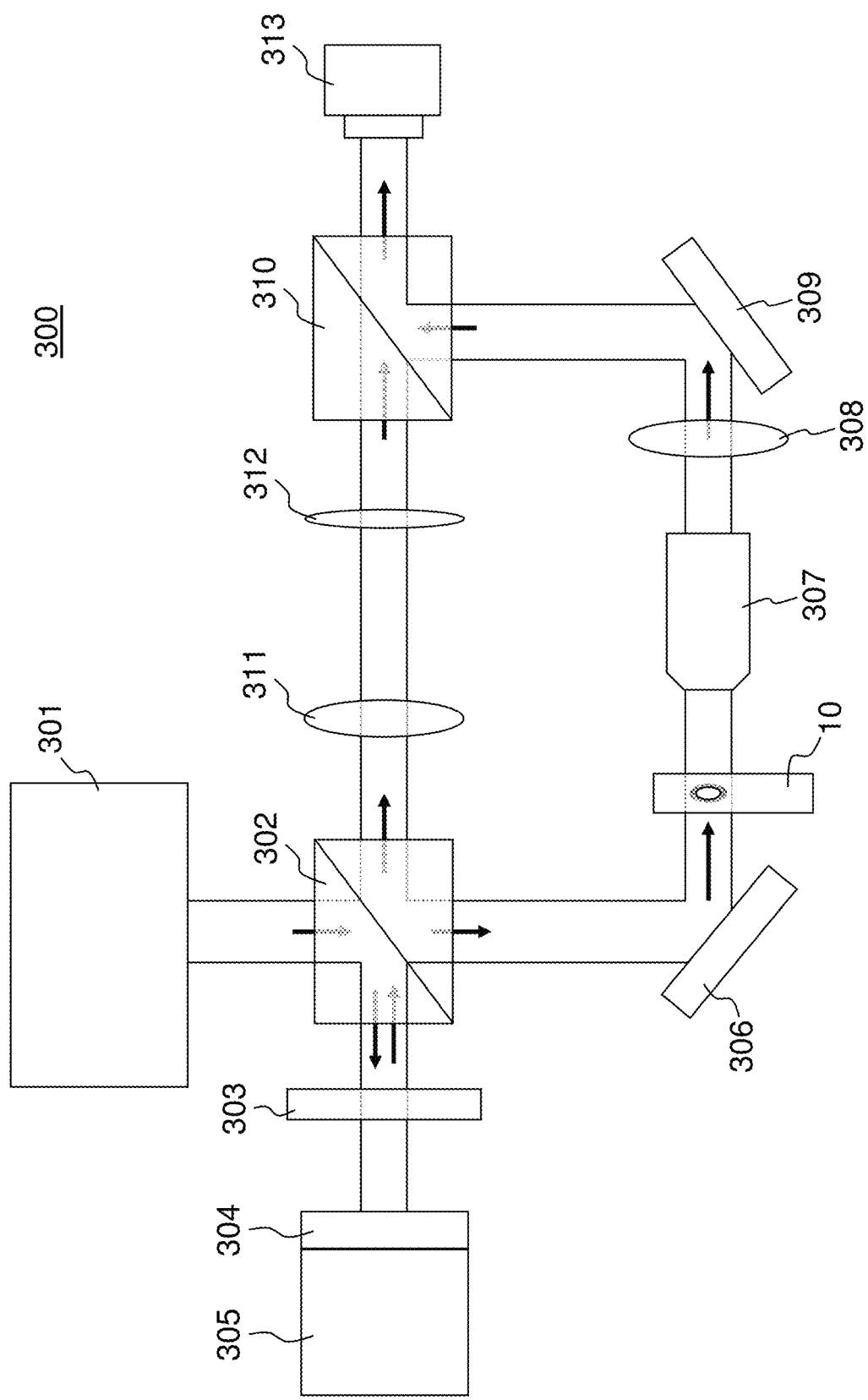
FIG. 3, is a diagram illustrating, according to another example, a second subsystem of a laser inscription system according to this description, for the measurement of the real part of the refractive index in the semiconductor material.

FIG. 3 represents a diagram illustrating an example of a phase microscope 300 for measuring the real part of the refractive index in the semiconductor material.

The phase microscope 300 includes an illumination source 301, for example a pulsed laser suitable for the emission of ultrashort pulses (<1 ps) for which the wavelength is within the spectral transparency band of the material. The light is separated into two arms by means of a separator element 302 to form an interferometer, in this example a Mach-Zehnder interferometer. The separator element is, for example, a linear polarizer. The first so-called "reference arm" (component reflected by the separator element 302) includes a mirror 304, for example a gold mirror, mounted on a piezoelectric motor 305 to ensure nanometric displacements. In the example of FIG. 3, the reference arm further comprises a quarter-wave plate 303, so that the beam, after reflection on the mirror 304, passes again through the quarter-wave plate 303 rotating its polarization; it is then transmitted through the polarizer 302. An afocal system consisting of lenses 311 and 312 allows the beam size to be adjusted. The reference beam finally passes through a second separator element 310, for example another polarizer, and is transmitted to a camera 313. The second arm, called the "measuring arm" (component transmitted by the separator element 302), first includes a mirror 306, for example a gold mirror. The beam is then directed towards the area to be observed in sample 10. Imaging is performed, for example, using a microscope lens 307. A tube lens 308 is used to collimate the beam. The measuring beam is then reflected by the mirror 309 onto the separator element 310 and then onto the camera 313. The camera then records interferences between the reference and measuring arms. By adjusting the optical path of the reference arm using the 304 piezoelectric motor, it is possible to acquire several images of these interferences with a given phase shift between each acquisition; for example four images with a phase shift of π/2 between each acquisition. It is then possible to simply link the intensity of the four images with the phase shift induced by the modification in sample 10. Since this phase shift is itself simply related to the relative index change, it is possible to measure this change. A phase microscope is described in J. H.'s article, for example. Bruning et al. ("*Digital Wavefront Measurement Interferometer for Testing Optical Surfaces and Lenses*", Appl. Optics, Vol. 13, Nr 11, pp 2633-2703). In the example of FIG. 3, a phase microscope as described in J. H. Bruning et al. is adapted to operate in transmission instead of reflection, and in the infrared.

Other devices for measuring the real part of the refractive index in the semiconductor material can be considered, such as other interferometric systems, holographic systems, a wavefront analyzer (type Shack Hartmann or its modified versions) all adapted to work in the infrared range.

These devices can be supplemented by non-quantitative diagnoses of the real part of the refractive index, such as darkfield microscopy or diffusion measurement. More precisely, the area to be observed in the sample is illuminated in a direction different from the direction of observation. In the event of a change in the real part of the refractive index, the area with the change in the real part of the refractive index scatters the incident light and becomes observable.

By measuring the real part of the refractive index in the semiconductor material, it is possible to modify the laser beam parameters (e. g. number of shots, energy) to gradually increase the variation of the refractive index and achieve the desired optical function in the material without inducing damage. Indeed, the absorption of an excessively intense laser flux is likely to locally increase the temperature of the material, giving rise to hydrodynamic phenomena (e.g. pressure or shock waves). In this case, the material is not locally densified but micro-cavities are likely to form. These cavities form uncontrolled defects that will induce diffusion losses and lower (or even eliminate) the optical performance of the optical component thus produced.

According to one or more examples of embodiment, for a given semiconductor material, "working windows" are determined for each of the parameters to be controlled in order to modify the real part of the refractive index. This preliminary calibration work makes possible to further improve efficiency during the implementation of the 3D laser marking process according to this description.

Figure 6:
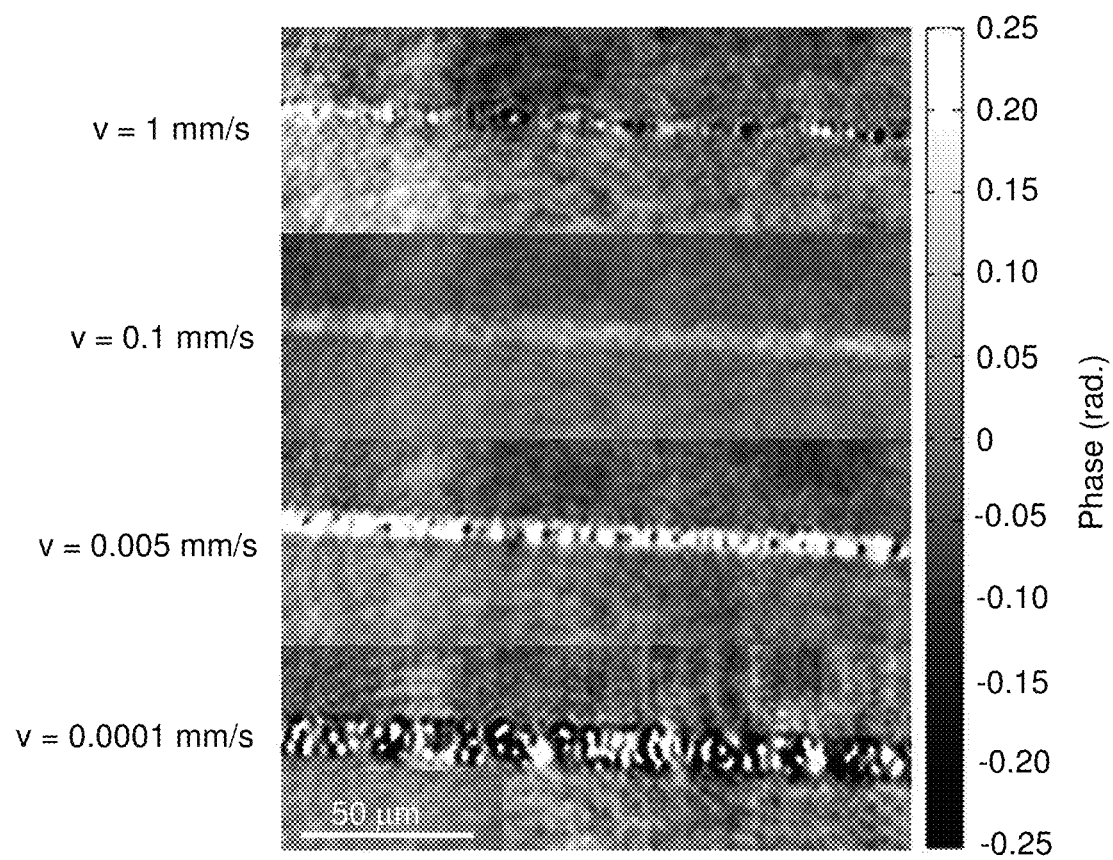
FIG. 6, shows experimental results revealing the induced phase variation for different scanning rates of the laser beam.

Thus, FIGS. 4 to 6 illustrate experimental results obtained by the inventors to show the influence of control parameters on the variation of the real part of the refractive index in a silicon sample.

The results shown in FIGS. 4 to 6 were obtained, for the creation of structural modifications of the material, with a first subsystem as represented on FIG. 2 and the phase image represented on FIG. 6 was obtained with a second subsystem as shown on FIG. 3.

More precisely, the first subsystem used includes a laser source 21 (MWTech, PFL-1550) producing pulses at a wavelength of 1550 nm, with a pulse duration of 5 ns and a repetition rate of 1 kHz. The energy on the target is controlled by a half-wave plate+polarizer assembly 23. The beam is then transported by gold mirrors (24 and 25). The laser beam is focused in sample 10 by a microscope objective 40 with a numerical aperture of 0.42, the diameter of the beam in the focal volume being 2.3 µm (measured at $1/e^2$) and the Rayleigh distance 2.8 µm in air and 9.8 µm in silicon. Motorized stages allow the sample to be positioned and moved in the plane (X,Z) perpendicular to the optical axis Y. A reflective infrared microscope 70 is implemented on the device to position the sample and visualize the irradiated area. It includes a Light-Emitting Diode (LED) 71, producing continuous light at 1200 nm. The incident light (701) first passes through a 50/50 semi-reflective blade (73). This light is then sent into the microscope lens 40 by a dichroic mirror 26, transparent at 1550 nm and reflecting at 1200 nm. The light is thus focused, then reflected on the sample 10. After reflection, the light follows the reverse path 702, and passes again through the semi-reflective blade 73. The transmitted light is finally collected by an InGaAs camera 70 which has a linear response at 1200 nm, and which allows the focus area to be visualized.

In addition, the phase microscope used for the formation of the image in FIG. 6 is of the type described on FIG. 3 and specifically includes a pulse (100 fs) laser 301 at 1300 nm (Spectra Physics Mai Tai® and Spectra Physics Hurricane® and Spectra Physics OPA 800CF®) and an InGaAs type camera 313.

The applicants have shown with the system thus achieved that a relative variation of the real part of the refractive index was measurable for pulse energies greater than 0.5 µJ, corresponding to light intensities per pulse greater than about 4 $GW/cm^2$.

FIGS. 4A to 4C show experimental results illustrating the influence of pulse energy at different scanning rates of the laser beam. In these figures, lines 401, 402, and 403 were written at the indicated energies and at a microscope objective displacement speed of 1 mm/s, 0.1 mm/s, and 0.01 mm/s. As can be seen in the figures, the morphology of the written line depends directly on the writing speed. Lines 401 and 403 have black spots that have been measured as cavities. On the other hand, the lines 402 are homogeneous modification channels (and therefore potentially waveguides). The width of the lines 402 depends on the laser energy. FIG. 4D represents an experimental curve illustrating the width of a waveguide obtained as a function of the energy per pulse. This width changes linearly as a function of the laser energy.

FIGS. 5A to 5J illustrate experimental results showing the influence of the scanning speed of the laser beam. These results, both consistent and complementary to those of FIGS. 4A to C, were obtained for an energy of 2 µJ. As may be observed, for writing speeds greater than or equal to 0.5 mm/s, damage is formed in the structure (FIGS. 5A and 5B). Damage is also present for speeds less than or equal to 0.01 mm/s (FIGS. 5E to 5J). In this case, it is noted that the lower the speed, the more damage there is to the structure. In addition, the written structure is all the wider than the speed is low. This accumulation indicates an increase in damage when the number of shots applied per point is large. For writing speeds between 0.01 mm/s and 0.5 mm/s, no damage is noticeable and the written waveguide is homogeneous.

FIG. 6 illustrates experimental results showing the induced phase variation at different scanning rates of the laser beam. Phase information provides information on the physical nature of the changes produced at an energy per pulse of 2 µJ. For a writing speed of 1 mm/s, the modification produced is composed of positive phase areas (i.e., optical densification) and negative phase areas (i.e., cavities, or damage). This is also the case for speeds of 0.005 mm/s and 0.0001 mm/s. It can be noted that the lower the writing speed, the more important the negative phase areas are. The modification created at a speed of 0.1 mm/s is homogeneous, positive, and without damage. The corresponding relative index variation is greater than $10^{-3}$, which is sufficient to guide light.

Figure 7A:
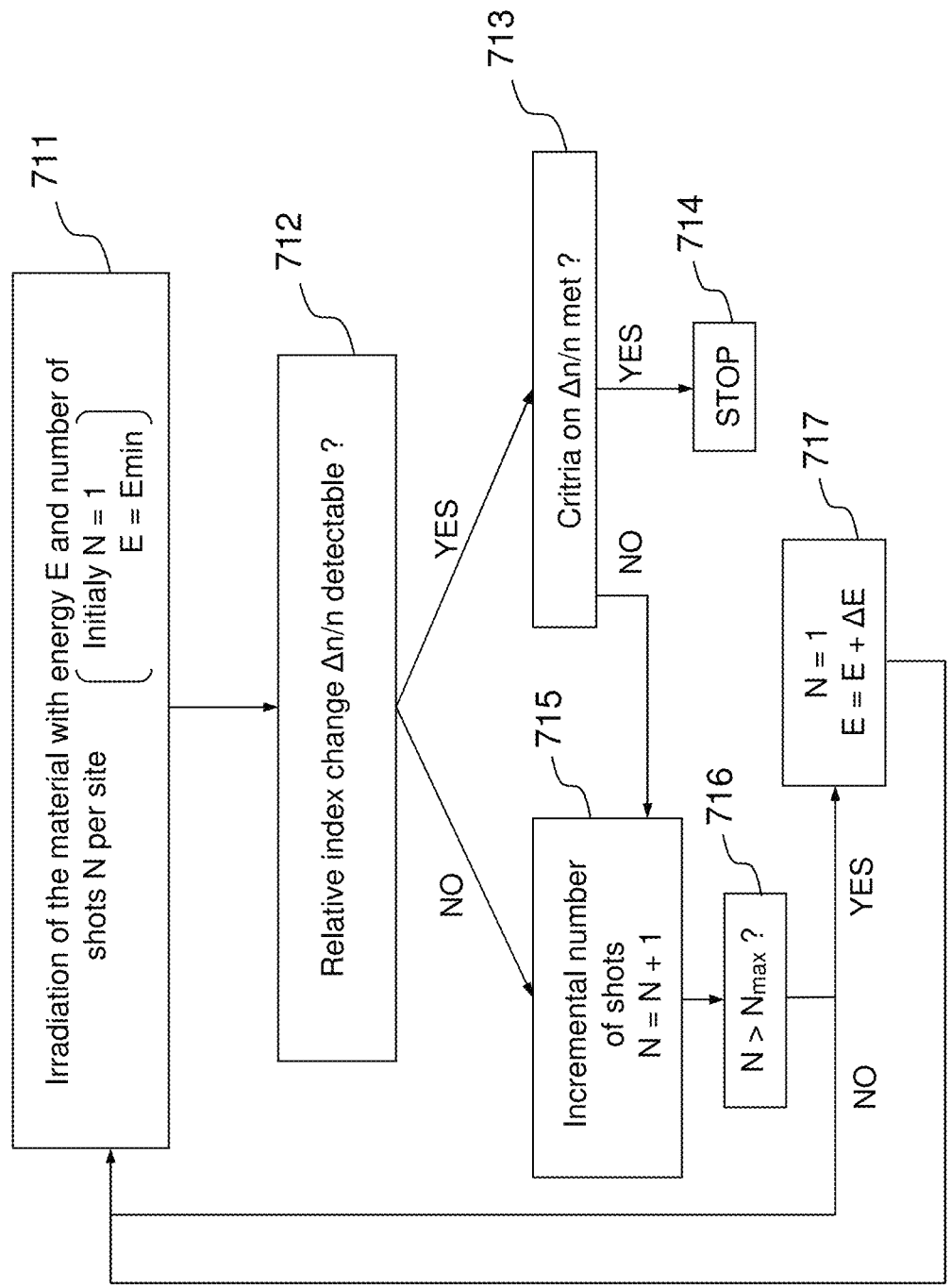
FIG. 7A, is an example of an experimental procedure with feedback on the device to irradiate the material until a necessary and sufficient change in light guidance is obtained.
Figure 7B:
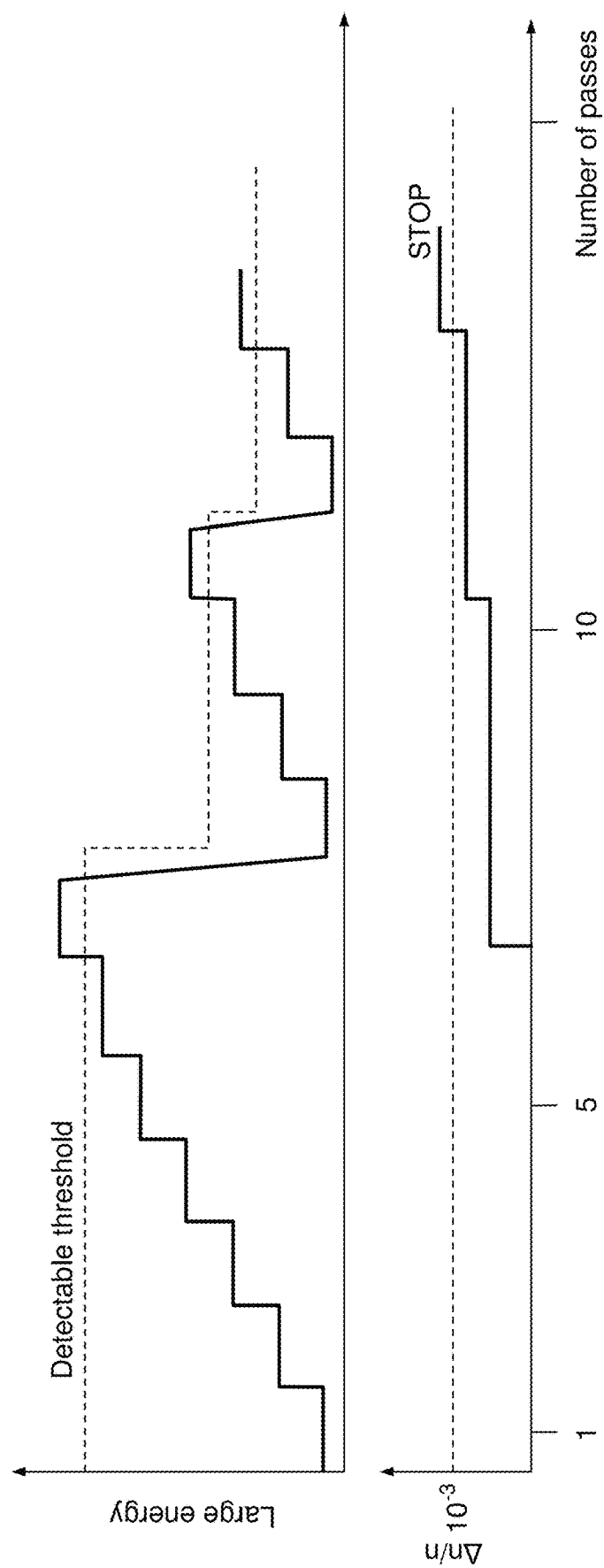
FIG. 7B, shows experimental results showing the induced index variation at constant scanning rate, and for different pulse energy increase cycles.

FIGS. 7A and 7B illustrate examples of how the process can be used according to this description to control the variation in the refractive index even more finely. In these examples, feedback on the number of shots and/or energy is proposed for a progressive variation of the real part of the refractive index. More specifically, the process includes iterative steps to control the number of pulses received per point of the pattern, each step being defined by obtaining a predefined value of the relative variation of the real part of the refractive index, for example the minimum detectable. The steps are continued until the relative variation $\Delta n/n$ of the real part of the refractive index sought is obtained.

FIG. 7A thus illustrates a first example of a multi-step process as described here. In a first step (711), the number of shots N and energy are fixed at predetermined values, for example N=1 and E=Emin, for example E=0.1 µJ. The relative variation of the index is measured (step 712). Each time the relative index variation is detectable, it is verified (713) that the $\Delta n/n$ criterion is met, i.e. that the desired value for the relative index variation is reached. If this is the case, the process is stopped (714). If the index variation is not detectable, or the $\Delta n/n$ criterion not met, step 711 is repeated after incrementing the number of shots (715) until a maximum number of shots Nmax (716) is reached. When the maximum number of shots has been reached, the first step is repeated, for example by increasing the energy and starting from the initial number of shots N=1.

In the example of FIG. 7A, the number of shots is increased during each stage while the energy is kept constant and increases as the next stage passes.

FIG. 7B illustrates a variant in which the energy is increased each time the laser beam passes over a point in the pattern until it exceeds the threshold for which an index change is detected (depending on the sensitivity of the phase microscope). By performing a new energy "ramp" (second step) a change to lower energy is detected. This is repeated until the index of the desired value changes relatively, e. g. $+10^{-3}$.

The approaches described allow the material to be modified each time as close as possible to the threshold for a very progressive effect necessary for a homogeneous variation. This is an example of a process that can be generalized to other control parameters.

According to one or more examples of embodiment, it is possible to have an increased progressivity by coupling the quantitative measurement of the real part of the refractive index with a non-quantitative measurement by measuring a diffusion signal resulting from the illumination of the area to be observed in a direction different from the observation direction. In the event of a change in the real part of the index, the area with a change in the real part of the index scatters the incident light and becomes observable. In the examples of FIGS. 7A, 7B, iterations can be performed on a criterion related to the diffusion signal, until the value of index $\Delta n$ becomes measurable by phase microscopy or other. The stop condition (714) remains at the value of $\Delta n$ reached. For example, the material is irradiated under increasing conditions (e. g. energy, number of shots) until the diffusion signal is detectable indicating a change in index (even if the change is not measured quantitatively). The procedure can be iterated to gradually increase the diffusion signal as many times as necessary to achieve a change in refractive index accessible by quantitative measurement. The diffusion signal (non-quantitative) and any other optical measurement that reflects a change in the index can offer an even greater progressiveness when the sensitivity to the change of the index is high.

Through the implementation of the 3D laser inscription process as described here, the applicants were able to demonstrate optical functionalization by direct deep laser inscription in a silicon sample. FIGS. 8 to 10 show the experimental results obtained.

For these experiments, a system as described on FIG. 2 was used (see description of the various elements above, in relation to FIGS. 4 to 6).

Figure 8A:
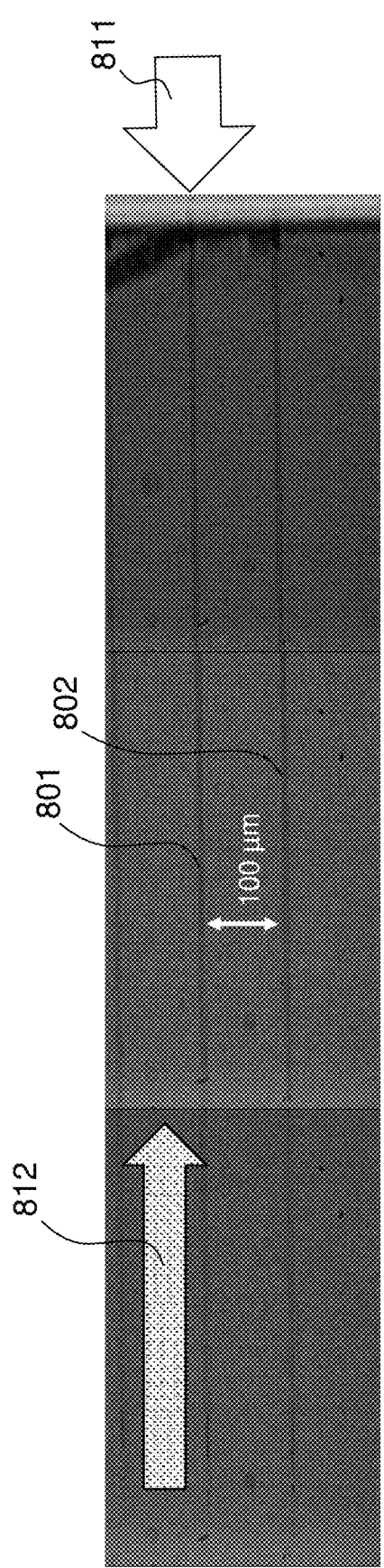
FIGS. 8A and 8B, show experimental results showing the propagation of light in an elementary waveguide obtained by a process according to this description, in silicon, the light being injected in the direction of the waveguide.
Figure 8B:
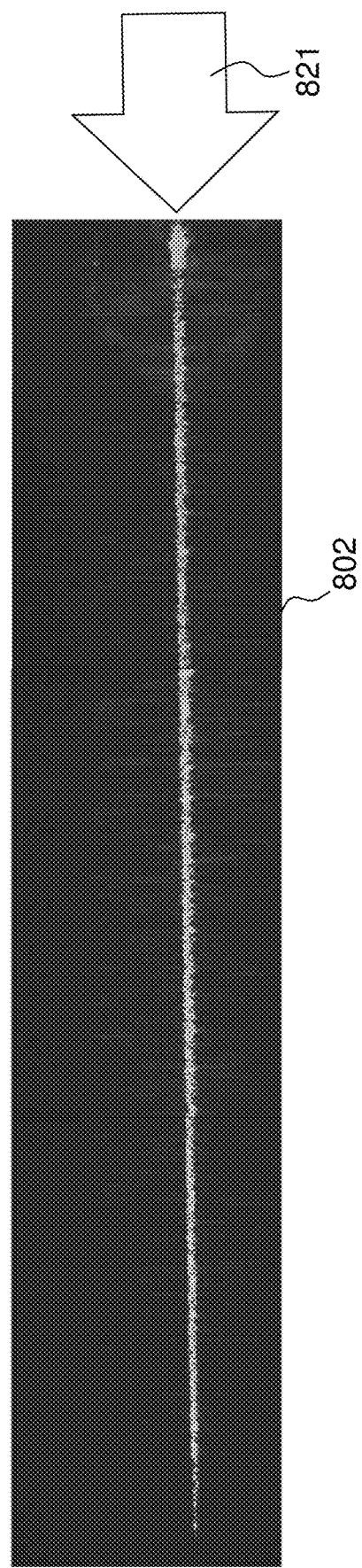

More specifically, FIGS. 8A and 8B show images illustrating a first example of light propagation in an elementary waveguide obtained by a process according to this description. The image illustrated on FIG. 8A is acquired by an InGaAs camera illuminated in white light. It offers a visualization of waveguides 801 and 802. The focal point is moved in direction 812, opposite to the propagation of the laser 811. The image illustrated on FIG. 8B corresponding to the same site is acquired by the same camera to detect the light scattered in the waveguide. A laser diode produces continuous light 821 at 1550 nm which is focused at the input of the waveguide 802, parallel to it. The light propagates inside the waveguide.

FIGS. 9A and 9B show a second example of light propagation in an elementary waveguide obtained by a process according to this description. In FIG. 9A, arrows 911 and 912 correspond respectively to the direction of propagation of the writing laser and the direction of movement of the focal point. Three waveguides 901, 902 and 903 have been written. The image illustrated on FIG. 9B was obtained in the same way as on FIG. 8B, but by introducing an angle of incidence of 35° between the continuous light 921 and the waveguide 903. It can be noted that the light preferably follows the direction of the waveguide, despite the angle introduced. Nevertheless, the coupling is not as good as in the case of parallel injection to the waveguide.

Figures 10A, 10B:
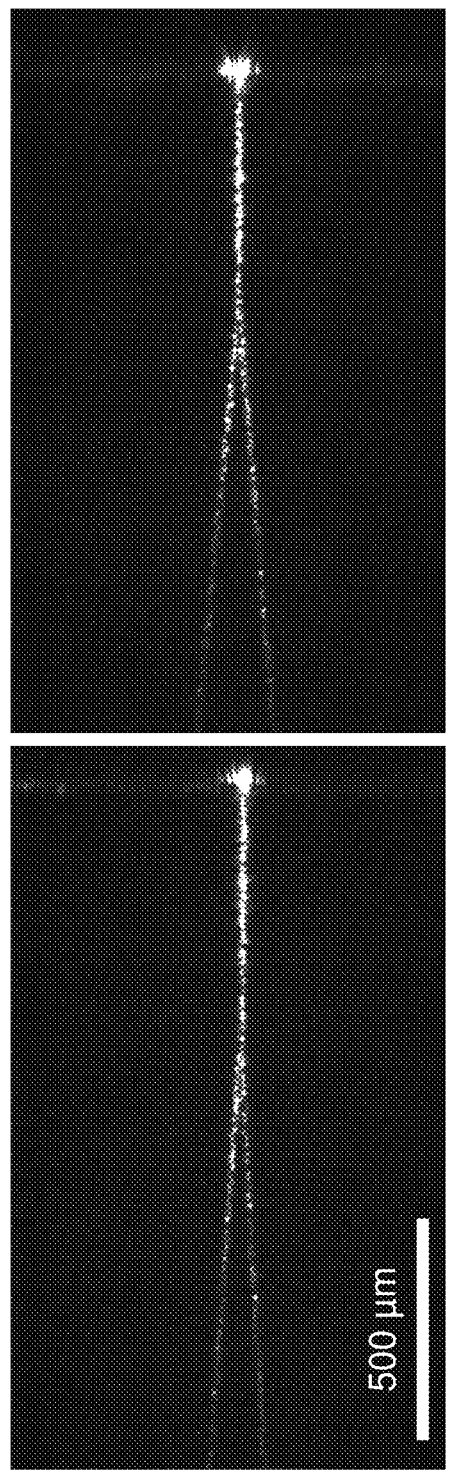
FIGS. 10A and 10B, show experimental results showing the propagation of light in Y-couplers obtained by a process as described above, in silicon, for different angles of the coupler.

FIGS. 10A and 10B show a third and fourth example of light propagation in a Y-coupler obtained by a process according to this description. The two arms of the "Y" are inscribed from the inside of the silicon to the surface and meet at a point. Then, an elementary waveguide is written from this point to the surface of the sample. As well as for FIGS. 8B and 9B, a 1550 nm light is injected into the input of the Y-coupler. The light is then guided at the beginning of the coupler and distributed in each of the two arms, instead of propagating in a straight line. These examples of Y-couplers are a particularly interesting functionalization of the material since they allow light to flow simultaneously to different places.

In conclusion, these demonstrations show that it is possible to write with the described methodology all devices based on an index change $>10^{-3}$ controlled with 3D micrometric resolution inside silicon and other semiconductors.

Although described though a number of detailed exemplary embodiments, the in-depth optical functionalization systems and processes of a sample of semiconductor material comprise different alternative embodiments, modifications and improvements which will be obvious to those skilled in the art, it being understood that these different alternative embodiments, modifications and improvements fall within the scope of the invention as defined in the following claims.

The invention claimed is:

1. A process for the in-depth optical functionalization of a sample made of semiconductor material, comprising:
   the emission of a laser beam formed by pulses of effective duration between 1 ps and 100 ns, having a wavelength in the spectral transparency band of the material;
   focusing in depth in the sample of the laser beam, according to a predetermined pattern, the light intensity per pulse in a focal volume of the laser beam being adapted for multiphoton absorption;
   measuring the real part of the refractive index of the sample at each point of the pattern;
   controlling the number of pulses received per pattern point as a function of said measurement of the real part of the refractive index so as to obtain, at each pattern point, a progressive modification of the real part of the refractive index of the material until a relative variation of the real part of the refractive index is greater than $10^{-3}$ in absolute value.

2. The process according to claim 1, wherein the pulses are emitted with a given repetition rate of less than 100 kHz.

3. The process according to claim 1, further comprising the relative movement of the laser beam and the sample along said pattern at a given scanning rate.

4. The process according to claim 1, wherein the control of the number of received pulses per point of the pattern comprises controlling a pulse repetition rate and/or controlling a scanning rate of the laser beam in the sample and/or controlling a dimension of the focal volume.

5. The process according to claim 1, further comprising controlling the light intensity per pulse in the focal volume to obtain the progressive modification of the real part of the refractive index of the material.

6. The process according to claim 1, wherein the control of the number of pulses comprises:
   a first step adjusting the number of pulses received per point of the pattern to achieve a first relative variation of the real part of the refractive index;
   at least a second step adjusting the number of pulses received per pattern point to achieve a second relative variation of the real part of the refractive index;
   an iteration of said second step until the relative variation of the real part of the refractive index greater than or equal to a predetermined value is obtained.

7. The process according to claim 6, wherein the first and second relative changes in the real part of the refractive index correspond to the smallest detectable change in the real part of the refractive index.

8. The process according to claim 6, comprising a gradual increase in the light intensity per pulse in the focal volume, from a predetermined minimum value, during each step.

9. The process according to claim 6, comprising increasing the light intensity per pulse in the focal volume from a predetermined minimum value upon transition from one step to a subsequent step.

10. The process according to claim 6, further comprising a preliminary calibration phase.

11. The process according to claim 1, wherein each of the pulses is formed by a train of ultrashort pulses of less than 1 ps duration.

12. The process according to claim 1, wherein the pattern is determined for the formation of at least one of the following optical elements: waveguide, microlens, diffraction grating, splitter, optical filter, wave plate.

13. A system for the in-depth optical functionalization of a sample of semiconductor material, comprising:
   a source for emitting a laser beam formed by pulses of effective duration between 1 ps and 100 ns, having a wavelength in the spectral transparency band of the material;
   a microscope objective for deep focusing in the sample of the laser beam in a predetermined pattern, the light intensity per pulse in a focal volume of the laser beam being adapted for multiphoton absorption in the semiconductor material;
   a device for measuring the real part of the refractive index of the sample at each point of the pattern;
   a control unit for controlling the number of pulses received per pattern point as a function of said measurement of the real part of the refractive index so as to obtain, at each pattern point, a progressive modification of the real part of the refractive index of the material until a relative variation of the real part of the refractive index greater than $10^{-3}$ in absolute value is obtained.

14. The system according to claim 13, further comprising relative displacement means for moving the focal volume and the sample to focus the laser beam in the predetermined pattern.

15. The system according to claim 13, wherein the measuring device is a phase microscope.

* * * * *